June 28, 1966  D. M. BARTOS ET AL  3,258,522
INSULATING CABLE SPLICES
Filed Oct. 4, 1963
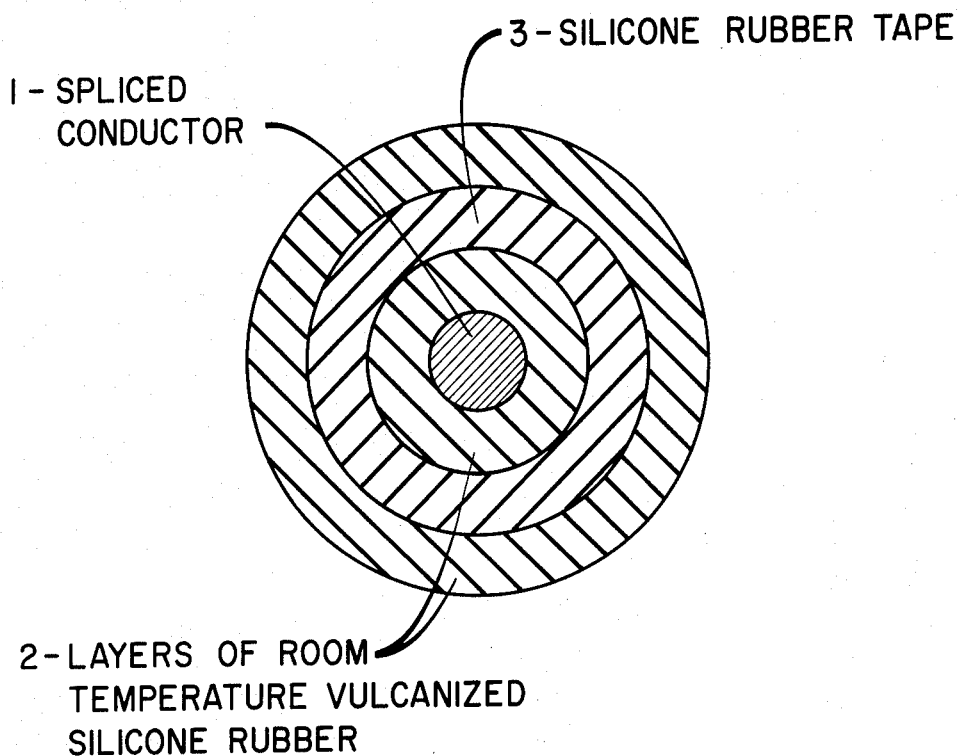
INVENTORS
DONALD M. BARTOS
GEORGE WILLIAM SWARTZBAUGH
BY
AGENT

United States Patent Office 3,258,522
Patented June 28, 1966

3,258,522
INSULATING CABLE SPLICES
Donald M. Bartos, Midland, Mich., and George William Swartzbaugh, Springfield, Pa., assignors to Dow Corning Corporation, Midland, Mich., a corporation of Michigan
Filed Oct. 4, 1963, Ser. No. 313,802
4 Claims. (Cl. 174—84)

This invention relates to a method for insulating electrical cable splices. This invention also relates to an insulation for splices in electrical conductors. This invention further relates to a spliced electrical cable wherein the splices are insulated in accordance with this invention.

Many methods for insulating splices have been suggested in the past. These methods include the use of vinyl and butyl rubber tapes in conjunction with filling compounds. The most common method of insulating cable splices today consists of building a frame around the splice, mixing together of the ingredients of the epoxy resin to be used as the insulation, filling the frame with the epoxy resin and then allowing the epoxy resin to cure. Employing this technique, it is generally possible for linemen to make only about two splices a day. Also this technique requires a relatively long period of time for the epoxy material to cure, and therefore, it may be a couple of days before the line can be put back into use again. The insulations employed heretofore have been lacking in the desired weatherability, resistance to ozone, resistance to ultraviolet radiation, flexibility and various other properties. In essence, no really satisfactory means for insulating splices had been found prior to this invention. It has now been found that by employing the process and the insulation of this invention that the disadvantages of this and other prior methods can be overcome. For example, a splice can easily be insulated employing the process of this invention in about 20 minutes. Furthermore, as soon as the splice is insulated, the line can be put back into service immediately. The process and insulation of this invention is particularly useful for insulating splices in high voltage lines. The insulation can be employed on either indoor, outdoor or underground lines. The insulation exhibits outstanding weathering properties, resistance to ozone on high voltage lines and resistance to ultraviolet radiation. Moreover, the insulation has a high degree of flexibility and hence is not subject to cracking as are the epoxy and other materials employed heretofore.

More specifically this invention relates to a method for insulating a splice in an electrical cable comprising the steps of (1) applying a layer of room temperature vulcanizable silicone rubber to the splice, (2) wrapping the splice with at least one layer of a self-adhering silicone rubber tape before the rubber applied in step (1) has cured, and (3) applying a layer of room temperature vulcanizable slicione rubber over the tape.

This invention also relates to an insulation for splices in electrical conductors comprising (1) a layer of cured room temperature vulcanizable silicone rubber, (2) at least one layer of a self-adhering silicone rubber tape, and (3) a layer of cured room temperature vulcanizable silicone rubber on the outside of the tape.

This invention further relates to a spliced electrical cable having insulated splices wherein the insulation on the splices comprises from the splice outward (1) a layer of cured room temperature vulcanizable silicone rubber, (2) at least one layer of a self-adhering silicone rubber tape, and (3) a layer of cured room temperature vulcanizable silicone rubber on the outside of the tape.

It should be understood that when reference is made herein to "applying" the silicone rubber or tape that it is meant to include not only the splice per se but also the areas immediately adjacent the splice.

Any room temperature vulcanizable silicone rubber can be employed in the process and insulation of this invention. The rubbers that are applied to the splice and over the tape can be the same silicone rubber or they can be different.

It is preferred to use a one component room temperature vulcanizable silicone rubber since these materials do not require mixing prior to use as do the two component rubebrs. Illustrative of the room temperature vulcanizable silicone rubbers that can be employed in the process and insulation of this invention are as follows:

(1) The combination of an acid free diorganopolysiloxane, a silicate and a metal salt of a carboxylic acid such as those described in U.S. Patent No. 2,927,907.

(2) The combination of a diorganopolysiloxane containing silicon-bonded hydroxyl groups, cellosolve silicates and metal salts of carboxylic acids such as those disclosed in U.S. Patent No. 2,902,467.

(3) The diacycloxy endlocked diorganopolysiloxanes such as those disclosed in U.S. Patent No. 3,035,016.

(4) The combination of from .01 to 5% by weight of an organohydrogenpolysiloxane, a diorganopolysiloxane containing at least two SiOH groups per molecule and a metal salt of a carboxylic acid as disclosed in U.S. Patent No. 3,061,567.

(5) The combination of an acid free diorganopolysiloxane, an alkylpolysilicate, and a condensation product of an aldehyde and an amine such as those described in U.S. Patent No. 2,833,742.

(6) The combination of a polysiloxane containing silicon-bonded hydroxyl groups and a silane containing silicon-bonded oxime radicals such as disclosed in copending application Serial No. 222,167, filed September 7, 1962, now U.S. Patent No. 3,189,576.

(7) The combination of a polysiloxane containing silicon-bonded hydroxyl groups, a silane containing silicon-bonded oxime radicals, a carboxylic acid anhydride and magnesium oxide such as disclosed in copending application Serial No. 218,497, filed August 2, 1962, now U.S. Patent No. 3,184,427.

(8) The combination of a polysiloxane containing silicon-bonded hydroxyl groups, an alkoxysilane and either an organotitanate or organosiloxytitanium catalyst such as disclosed in copending application Serial No. 195,381, filed May 17, 1962.

The silicone rubber tape that is employed in this invention must be a self-adhering tape. Such tapes are well known to those skilled in the art. An example of a suitable suitable tape composition is one comprising vulcanized silicone rubber containing a small amount of boron added as an alkyl borate. Such tapes, their compositions and methods of preparation are more fully disclosed in Canadian Patent No. 626,152. While the shape of the tape employed is not particularly critical, it is preferred to use a tapered tape and more specifically an essentially triangular shaped tape. The advantages of using such tapes are more fully disclosed in Canadian Patent No. 588,913.

The disclosures of all of the patents and patent applications referred to herein are incorporated into this application by reference.

In some instances it may be desirable to incorporate a suitable semiconductor material into the room temperature vulcanizable silicone rubber that is used on top of the tape. This is done to help distribute any electrical stresses present. Any suitable semiconducting material can be employed. Illustrative of the materials that can be used are silicon carbide, finely divided silver powders, copper or iron filings, or carbon black. Of these materials applicants prefer to employ carbon black.

Another and alternative means of distributing the electrical stresses consists of covering the silicone rubber tape with a sheath of metal braid connected to ground and then applying a layer of room temperature vulcanizable silicone rubber over the top of the metal sheath.

A particularly preferred formulation of a room temperature vulcanizable silicone rubber that can be employed consists essentially of 100 parts of a partially trimethylsilyl endblocked polydimethylsiloxane polymer, 6 to 8 parts of a silica filler having a surface area of about 200 square meters per gram, 1 to 3 parts of a hydroxy endbocked phenylmethylsiloxane fluid having a viscosity in the range of about 400 to 850 cs. and containing about 3.5 to 5 percent by weight silicon-bonded hydroxyl groups, 65 to 75 parts of an iron oxide filler (Williams red oxide, WRO 3097) and 9 to 11 parts of methyltriacetoxysilane, all parts being by weight.

A particularly preferred formulation of a room temperature vulcanizable silicone rubber containing a semiconductive material consists essentially of 102 to 104 parts of a hydroxy endblocked polydimethylsiloxane fluid having a viscosity in the range of about 10,000 to 15,000 cs. and containing about .08 percent by weight silicon-bonded hydroxyl groups, 3 to 5 parts of a hydroxy endblocked phenylmethylsiloxane fluid having a viscosity in the range of about 400 to 850 cs. and containing about 3.5 to 5 percent by weight silicon-bonded hydroxyl groups, 13 to 17 parts of a polydimethylsiloxane fluid having a viscosity of about 1,000 cs., 18 to 22 parts of carbon black, 8 to 10 parts of methyltriacetoxysilane and .04 to .06 part of dibutyltin diacetate, all parts being by weight.

In accordance with the process of this invention, first a layer of room temperature vulcanizable silicone rubber is applied over the spliced cable. Then, before the rubber has had a chance to cure, the splice is wrapped (preferably with half lapping) with a self-adhering silicone rubber tape. Finally, another room temperature vulcanizable silicone rubber is applied over the tape. The room temperature vulcanizable rubber is then allowed to cure with a good insulation being formed. However, as pointed out previously, the line can be put back into service immediately without having to wait for the rubber to become cured or vulcanized.

The insulated cable splice of this invention is illustrated by the drawing which is a cross section through the splice. More specifically, the drawing shows a spliced conductor 1 insulated with layers of cured silicone rubber 2 and a layer of self-adhering silicone rubber tape 3.

The silicone rubber can be applied by any suitable means. For example, it can be smeared on by hand, applied from a tube, applied with a brush, buttered on with a spatula, etc. A particularly suitable means for applying the outside layer of silicone rubber comprises applying the rubber to the tape and then spreading it out into an even, neat looking coat with a brush dipped in a solvent.

For many purposes a single layer of tape will suffice, however, if so desired or where a particular application demands, as many layers of tape as are desired can be applied.

That which is claimed is:

1. In a spliced electrical cable having insulated splices, the improvement comprising an insulation on the splices comprising, from the splice outward,
    (1) a first layer of cured room temperature vulcanizable silicone rubber paste, then
    (2) at least one layer of a self-adhering silicone rubber tape disposed on said first layer, and finally,
    (3) a layer of cured room temperature vulcanizable silicone rubber paste on the outside of the tape.

2. The cable of claim 1 wherein the room temperature vulcanizable silicone rubber employed in layer (3) also contains a semiconductor material.

3. In a spliced electrical cable having insulated splices, the improvement comprising an insulation on the splices comprising, from the splice outward,
    (1) a first layer of cured silicone rubber prepared from a room temperature vulcanizable silicone rubber consisting essentially of 100 parts of a partially trimethylsilyl endblocked polydimethylsiloxane polymer, 6 to 8 parts of a silica filler having a surface area of about 200 square meters per gram, 1 to 3 parts of a hydroxy endblocked phenylmethylsiloxane fluid having a viscosity in the range of about 400 to 850 cs. and containing about 3.5 to 5 percent by weight silicon-bonded hydroxyl groups, 65 to 75 parts of an iron oxide filler and 9 to 11 parts of methyltriacetoxysilane, all parts being by weight,
    (2) at least one layer of a self-adhering silicone rubber tape disposed on said first layer, and
    (3) another layer of the cured room temperature vulcanizable silicone rubber set forth in (1) on the outside of the tape.

4. In a spliced electrical cable having insulated splices, the improvement comprising an insulation on the splices comprising, from the splice outward,
    (1) a first layer of cured silicone rubber prepared from a room temperature vulcanizable silicone rubber consisting essentially of 100 parts of a partially trimethylsilyl endblocked polydimethylsiloxane polymer, 6 to 8 parts of a silica filler having a surface area of about 200 square meters per gram, 1 to 3 parts of a hydroxy endblocked phenylmethylsiloxane fluid having a viscosity in the range of about 400 to 850 cs. and containing about 3.5 to 5 percent by weight silicon-bonded hydroxyl groups, 65 to 75 parts of an iron oxide filler and 9 to 11 parts of methyltriacetoxysilane, all parts being by weight,
    (2) at least one layer of a self-adhering silicone rubber tape disposed on said first layer, and
    (3) a layer of cured silicone rubber on the outside of the tape prepared from a room temperature vulcanizable silicone rubber consisting essentially of 102 to 104 parts of a hydroxy endblocked polydimethylsiloxane fluid having a viscosity in the range of about 10,000 to 15,000 cs. and containing about .08 percent by weight silicon-bonded hydroxyl groups, 3 to 5 parts of a hydroxy endblocked phenylmethylsiloxane fluid having a viscosity in the range of about 400 to 850 cs. and containing about 3.5 to 5 percent by weight silicon-bonded hydroxyl groups, 13 to 17 parts of a polydimethylsiloxane fluid having a viscosity of about 1,000 cs., 18 to 22 parts of carbon black, 8 to 10 parts of methyltriacetoxysilane and .04 to .06 part of dibutyltin diacetate all parts being by weight.

References Cited by the Examiner

UNITED STATES PATENTS 2,975,088   3/1961   Rossman et al. _____ 174—120 X

FOREIGN PATENTS 868,041   5/1961   Great Britain.
870,583   6/1961   Great Britain.

LARAMIE E. ASKIN, *Primary Examiner.*

DARRELL L. CLAY, ROBERT K. SCHAEFER,
*Examiners.*